(12) United States Patent
Choi et al.

(10) Patent No.: US 7,499,114 B2
(45) Date of Patent: Mar. 3, 2009

(54) LIQUID CRYSTAL DISPLAY DEVICE HAVING TOUCH SCREEN FUNCTION AND METHOD OF FABRICATING THE SAME

(75) Inventors: Joon-hoo Choi, Seoul (KR); In-soo Joo, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/857,816

(22) Filed: Sep. 19, 2007

(65) Prior Publication Data

US 2008/0067528 A1 Mar. 20, 2008

Related U.S. Application Data

(62) Division of application No. 10/865,996, filed on Jun. 11, 2004, now Pat. No. 7,280,167.

(30) Foreign Application Priority Data

Nov. 4, 2003 (KR) ............................ 2003-0077574

(51) Int. Cl.
*G02F 1/1335* (2006.01)
(52) U.S. Cl. ......................................... 349/12; 345/173
(58) Field of Classification Search .................. 349/12; 345/173–182
See application file for complete search history.

(56) References Cited

U.S. PATENT DOCUMENTS

| 4,345,248 | A | 8/1982 | Togashi et al. |
| 5,534,892 | A | 7/1996 | Tagawa |
| 5,963,277 | A | 10/1999 | Kim et al. |
| 6,204,897 | B1 | 3/2001 | Colgan et al. |
| 6,714,268 | B2 | 3/2004 | Wang et al. |
| 2003/0156087 | A1 | 8/2003 | Boer et al. |
| 2004/0150629 | A1 | 8/2004 | Lee |

FOREIGN PATENT DOCUMENTS

| KR | 100293435 | 4/2001 |
| KR | 1020030022747 | 3/2003 |
| KR | 1020040001324 | 1/2004 |

OTHER PUBLICATIONS

International Search Report; PCT/KR2004/000184; Jun. 28, 2004.
Written Opinion of the International Searching Authority; PCT/KR2004/000184; Jun. 28, 2004.

*Primary Examiner*—David Nelms
*Assistant Examiner*—Phu Vu
(74) *Attorney, Agent, or Firm*—Cantor Colburn LLP

(57) ABSTRACT

The present invention relates to an LCD device having a touch screen function. The LCD device of the present invention includes a plurality of gate lines, a plurality of data lines intersecting the gate lines, and a plurality of signal lines that are insulated from and juxtaposed with the data lines. First to third switching elements are formed in each of a plurality of pixel regions in the form of a matrix, which are surrounded by the gate lines and the data lines. Here, a gate electrode of the first switching element is connected to a gate line Gn, a source electrode thereof is connected to the data line, and a drain electrode thereof is connected to a pixel electrode. Further, liquid crystal capacitance and storage capacitance are formed between the pixel electrode and a common electrode. At this time, the liquid crystal capacitance is changed due to variation in the liquid crystal cell gap. The second and third switching elements are designed to read variation in the liquid crystal capacitance. A source electrode of the second switching element is connected to the pixel electrode, a drain electrode thereof is connected to the signal line, and a gate electrode thereof is connected to a previous gate line Gn-1. Furthermore, a source electrode of the third switching element is connected to the data line, a drain electrode thereof is connected to the pixel electrode, and a gate electrode thereof is connected to a second previous gate line Gn-2. Each signal line is connected to each signal amplifier.

8 Claims, 23 Drawing Sheets

LIQUID CRYSTAL DISPLAY DEVICE HAVING TOUCH SCREEN FUNCTION AND METHOD OF FABRICATING THE SAME

CROSS REFERENCE TO RELATED APPLICATIONS

This application is a divisional application of U.S. application Ser. No. 10/865,996 filed Jun. 11, 2004, which claims priority to and the benefit of Korean Patent Application No. 2003-0077574 filed on Nov. 4, 2003, both of which are incorporated by reference herein in their entirety.

BACKGROUND OF THE INVENTION

This application claims the priority of Korean Patent Application No. 10-2003-0077574 filed on Nov. 4, 2003 in the Korean Intellectual Property Office, the disclosure of which is incorporated herein by reference.

1. Field of the Invention

The present invention relates to a liquid crystal display device having a touch screen function. More particularly, the present invention is directed to a liquid crystal display device that is constructed to have a touch screen function using variation in liquid crystal cell capacitance due to variation in liquid crystal cell gaps.

2. Description of the Related Art

Generally, a liquid crystal display device is a display device for obtaining desired image signals by applying an electric field to a liquid crystal material that fills a gap between two substrates and has an anisotropic dielectric constant and controlling the intensity of the electric field, thereby adjusting the amount of light that is transmitted through the substrates.

Recently, touch screen panels (TSP) have become widely used as an input means. A TSP is a device that reads user's input in the form of a coordinate value and receives information corresponding to the read coordinate value.

Heretofore, it is common that an additional touch panel is stacked and attached to a surface of a liquid crystal panel so as to add a touch screen function to a liquid crystal display (LCD) device.

However, the LCD device in which a touch panel is attached to the liquid crystal panel as mentioned above cannot provide high quality images, because the images are excessively floated due to light parallax occurring when light for displaying images reproduced on the liquid crystal panel is transmitted through the touch panel.

Furthermore, since the additional process of attaching the two panels to each other is required, the number of processes increases. Therefore, there are problems in that it takes a lot of time to fabricate an LCD device while manufacturing costs also increase.

SUMMARY OF THE INVENTION

The present invention is conceived to solve the aforementioned problems. Accordingly, an object of the present invention is to provide an LCD device that can implement a touch screen function by constructing a circuit capable of reading variation in a liquid crystal cell gap without a need to separately attach a touch panel to the LCD device.

According to an aspect of the present invention for achieving the object, there is provided a liquid crystal display (LCD) device having a touch screen function, comprising a plurality of gate lines that transfer scan signals; a plurality of data lines that intersect the gate lines; a plurality of signal lines that are formed in parallel with the data lines; two or more switching elements that are formed in each of a plurality of pixel regions in the form of a matrix, which are surrounded by the gate lines and the data lines; and signal amplifiers that receive signals applied to the signal lines in response to the operation of the two or more switching elements.

At this time, three switching elements may be formed in each pixel region. Preferably, the first switching element among them is turned on to charge a relevant data voltage when a gate-on signal is applied to a relevant gate line, the second switching element is turned on to charge a previous data voltage when the gate-on signal is applied to a previous gate line, and the third switching element is turned on to apply the previous data voltage to the signal line when the gate-on signal is applied to a second previous gate line.

Further, two switching elements may be formed in each pixel region. Preferably, the first switching element is turned on to charge a relevant data voltage when a gate-on signal is applied to a relevant gate line, and the second switching element is turned on to apply the data voltage charged during a previous frame time to the signal line when the gate-on signal is applied to a previous gate line.

According to another aspect of the present invention, there is provided a thin film transistor substrate for an LCD device having a touch screen function, comprising an insulating substrate; a gate line formed on the insulating substrate; a gate insulating film covered on the gate line; a data line that intersects the gate line and defines a pixel region on the gate insulating film; a signal line formed in parallel with the data line; a first thin film transistor electrically connected to both the gate line and the data line; a second thin film transistor electrically connected to both a previous gate line and the signal line; a third thin film transistor electrically connected to a second previous gate line and the data line; a protection film that covers the first to third thin film transistors, the data line and the signal line, and includes first to third contact holes through which each of drain electrodes of the first to third thin film transistors is exposed; and a pixel electrode that is connected to the first to third drain electrodes through the first to third contact holes.

Preferably, the third thin film transistor is formed in a previous pixel region and the third drain electrode extends up to the relevant pixel region and is connected to the relevant pixel electrode through the third contact hole.

According to a further aspect of the present invention, there is provided a method of fabricating a thin film transistor substrate for an LCD device having a touch screen function, comprising the steps of forming gate wiring including a gate line and first to third gate electrodes on an insulating substrate; forming a gate insulating film for covering the gate wiring; forming first to third semiconductor patterns on the gate insulating film; forming, on the gate insulating film, data wiring including a data line that intersects the gate line, first to third source electrodes and first to third drain electrodes that are electrically connected to the first to third semiconductor patterns, and a signal line that is connected to the second source electrode; forming a protection film that covers the semiconductor patterns and the data wiring; forming first to third contact holes, through which the first to third drain electrodes are exposed, in the protection film; and forming a pixel electrode that is connected to the first to third drain electrodes through the first to third contact holes.

At this time, the third drain electrode may extend from a previous pixel region up to a relevant pixel region and be connected to a relevant pixel electrode though the third contact hole.

According to a still further aspect of the present invention, there is provided a thin film transistor for an LCD device having a touch screen function, comprising an insulating substrate; a gate line formed on the insulating substrate; a gate insulating film covered on the gate line; a data line that intersects the gate line and defines a pixel region on the gate insulating film; a signal line formed in parallel with the data line; a first thin film transistor electrically connected to both the gate line and the data line; a second thin film transistor electrically connected to both a previous gate line and the signal line; a protection film that covers the first and second thin film transistors, the data line and the signal line, and includes first and second contact holes through which each of drain electrodes of the first and second thin film transistors is exposed; and a pixel electrode that is connected to the first and second drain electrodes through the first and second contact holes.

According to a still further aspect of the present invention, there is provided a method of fabricating a thin film transistor substrate for an LCD device having a touch screen function, comprising the steps of forming gate wiring including a gate line and first and second gate electrodes on an insulating substrate; forming a gate insulating film for covering the gate wiring; forming first and second semiconductor patterns on the gate insulating film; forming, on the gate insulating film, data wiring including a data line that intersects the gate line, first and second source electrodes and first and second drain electrodes that are electrically connected to the first and second semiconductor patterns, and a signal line that is connected to the second source electrode; forming a protection film that covers the semiconductor patterns and the data wiring; forming first and second contact holes, through which the first and second drain electrodes are exposed, in the protection film; and forming a pixel electrode that is connected to the first and second drain electrodes through the first and second contact holes.

BRIEF DESCRIPTION OF THE DRAWINGS

The above and other objects, features and advantages of the present invention will become apparent from the following description of preferred embodiments given in conjunction with the accompanying drawings, in which:

FIG. 16A is a view showing the arrangement of the substrate in the next fabrication step of FIG.15a.

DETAILED DESCRIPTION OF THE INVENTION

Hereinafter, preferred embodiments of the present invention will be described in detail with reference to the accompanying drawings.

Figure 1:
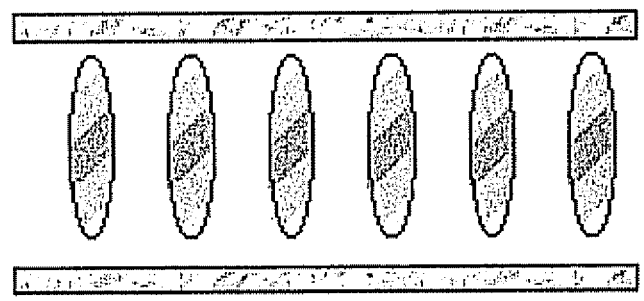
FIG. 1 shows the initial orientation of a liquid crystal where a liquid crystal panel is not touched.
Figure 2:
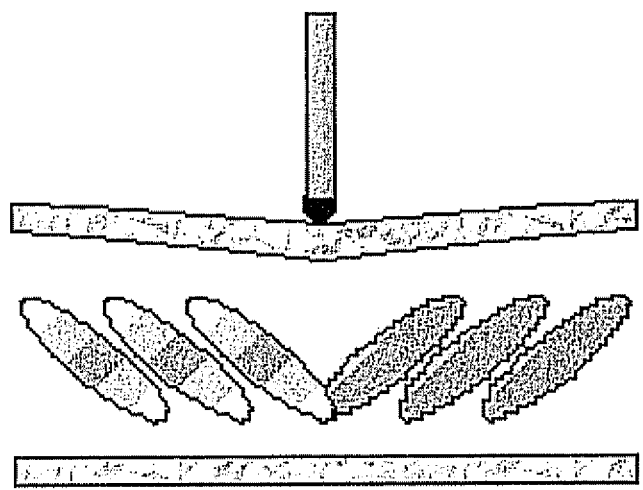
FIG. 2 shows the orientation of a liquid crystal changed due to variation in a cell gap when a liquid crystal panel is touched.

FIG. 1 shows the initial orientation of a liquid crystal where a liquid crystal panel is not touched, and FIG. 2 shows the orientation of a liquid crystal changed due to variation in a cell gap when a liquid crystal panel is touched.

When a liquid crystal panel is touched, it can be seen that a liquid crystal cell gap and thus the orientation of the liquid crystal are changed, as shown in FIG. 2.

Variation in the liquid crystal orientation and cell gap within a liquid crystal cell results in variation in capacitance of pixels.

In general, the capacitance of each pixel in a liquid crystal panel is the sum of liquid crystal capacitance Clc and storage capacitance Cst.

Here, the storage capacitance Cst is always constant and the liquid crystal capacitance Clc can be expressed as the following equation 1.

$$Clc = \epsilon_0 \epsilon_r A/d \quad (1)$$

where $\epsilon_0 \epsilon_r$ is the dielectric constant of a liquid crystal, A is the sectional area of a pixel, and d is the cell gap.

Therefore, since a liquid crystal has anisotropic properties in that its vertical and horizontal dielectric constants are different from each other, the value of the liquid crystal capacitance Clc is changed due to variation in the dielectric constant and cell gap when the liquid crystal panel has been touched.

Accordingly, the present invention aims to implement a touch screen function by reading the change in the liquid crystal capacitance Clc in the form of electrical signals.

Figure 3:
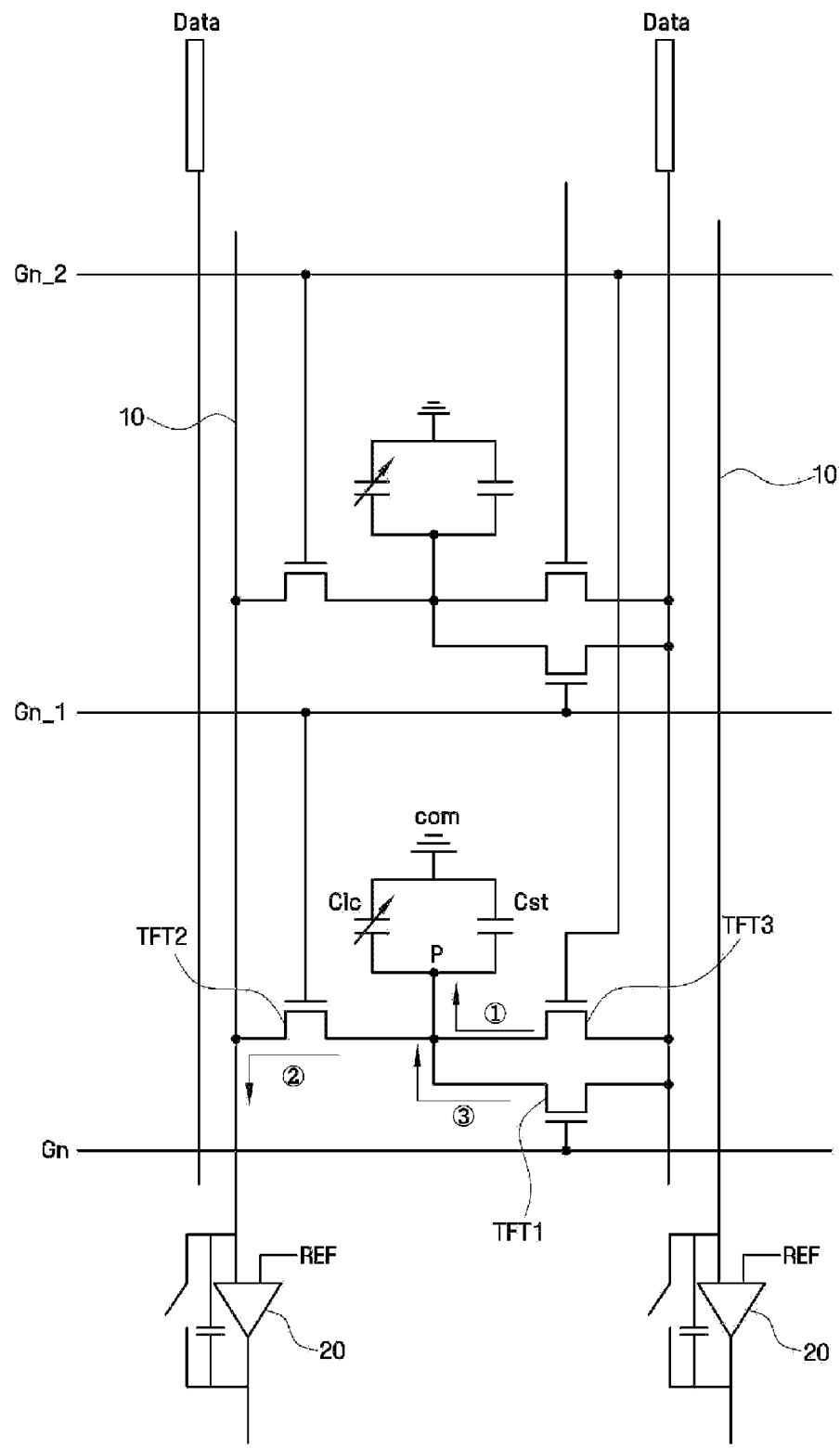
FIG. 3 is a circuit diagram illustrating the configuration of a liquid crystal display (LCD) device having a touch screen function according to a first embodiment of the present invention.

FIG. 3 is a circuit diagram illustrating the configuration of a liquid crystal display (LCD) device having a touch screen function according to a first embodiment of the present invention.

As shown in FIG. 3, the LCD according to the first embodiment of the present invention includes a plurality of gate lines Gn, Gn-1, Gn-2, . . . that transfer scan signals, and a plurality of data lines Data that intersect the gate lines Gn, Gn-1, Gn-2, . . . and transfer image data.

Further, a plurality of signal lines 10 are insulated from and juxtaposed with the data lines Data.

First to third switching elements TFT1, TFT2 and TFT3 are formed in each of a plurality of pixel regions in the form of a matrix, which are surrounded by the gate lines Gn, Gn-1, Gn-2, . . . and the data lines Data. At this time, it is preferred that each of the switching elements be a thin film transistor.

Here, a gate electrode of the first switching element TFT1 is connected to the gate line Gn, a source electrode thereof is connected to the data line Data, and a drain electrode thereof is connected to a pixel electrode P formed on a lower substrate of a liquid crystal panel. Further, a common electrode Com is formed on an upper substrate opposite to the lower substrate.

A liquid crystal material is filled between the pixel electrode P and the common electrode Com and it is equivalently represented as liquid crystal capacitance Clc. Storage capacitance Cst for maintaining a voltage applied to the liquid crystal capacitance Clc is also formed. The liquid crystal capacitance Clc and the storage capacitance (Cst) serve as driving loads of the LCD device.

In such a case, the liquid crystal capacitance Clc is changed due to variation in a liquid crystal cell gap. The second and third switching elements TFT2 and TFT3 for reading the variation in the liquid crystal capacitance Clc is configured as follows.

A source electrode of the second switching element TFT2 is connected to the pixel electrode P, a drain electrode thereof is connected to a signal line 10, and a gate electrode thereof is connected to a previous gate line Gn-1.

Further, a source electrode of the third switching element TFT3 is connected to the data line Data, a drain electrode thereof is connected to the pixel electrode P, and a gate electrode thereof is connected to a second previous gate line Gn-2.

The signal lines 10 are connected to signal amplifiers 20, respectively. Each of the signal amplifiers 20 compares a signal applied to each signal line 10 and a reference voltage REF and then amplifies the resultant signal in response to the ON operation of the second or third switching element TFT2 or TFT3, so that it can be determined whether there is a change in a cell gap at a desired location of the liquid crystal panel.

Now, the operation of the LCD device according to the first embodiment of the present invention will be described.

As gate-on signals are sequentially applied to the plurality of the gate lines according to gate pulses corresponding to gate-driving signals, data signals are applied to all the data lines in synchronization with clock signals and thus images are displayed on the LCD device.

As the gate-on signal is first applied to the second previous gate line Gn-2, the third switching element TFT3 is turned on and thus a data voltage Vdata to be applied to a second previous pixel region is charged with a pixel voltage.

At this time, the quantity of electric charge Q charged into the pixel can be expressed as the following equation 2.

$$Q = (\text{cell capacitance}) \times V\text{data} \quad (2)$$

That is, since the quantity of electric charge is constant, the applied data voltage Vdata varies according to variation in the capacitance of the liquid crystal cell (more specifically, the liquid crystal capacitance).

Next, as a gate-on signal is applied to the first previous gate line Gn-1, the second switching element TFT2 is turned on. Thus, the voltage charged into the cell is applied to the signal line 10 and then input to the signal amplifier 20.

At this time, the signal amplifier 20 compares the signal applied to the signal line 10 with the reference voltage REF and then amplifies the resultant signal. Thus, the signal amplifier can recognize variation in the charged voltage and accordingly determine whether there is variation in a cell gap at a relevant location of the liquid crystal panel.

Thereafter, as a gate-on signal is applied to a relevant gate line On, the first switching element TFT1 is turned on and thus the relevant data voltage Vdata is charged with a pixel voltage.

If it is assumed that the cell gap has changed at a relevant pixel region, an ON signal is applied to the second previous gate line and the data voltage to be charged into the second previous pixel region is thus temporarily charged into the relevant pixel region in order to read the change in the cell gap of the relevant pixel. Since this is very short as compared to frame time, however, it is impossible to visually check it.

According to the first embodiment of the present invention, variation in a pixel voltage due to variation in a liquid crystal cell gap can be recognized with only the operation of a switching element without attaching an additional touch panel to the LCD device. Therefore, a touch screen function can be readily implemented.

Next, an LCD device having a touch screen function according to a second embodiment of the present invention will be described with reference to FIG. 4.

Figure 4:
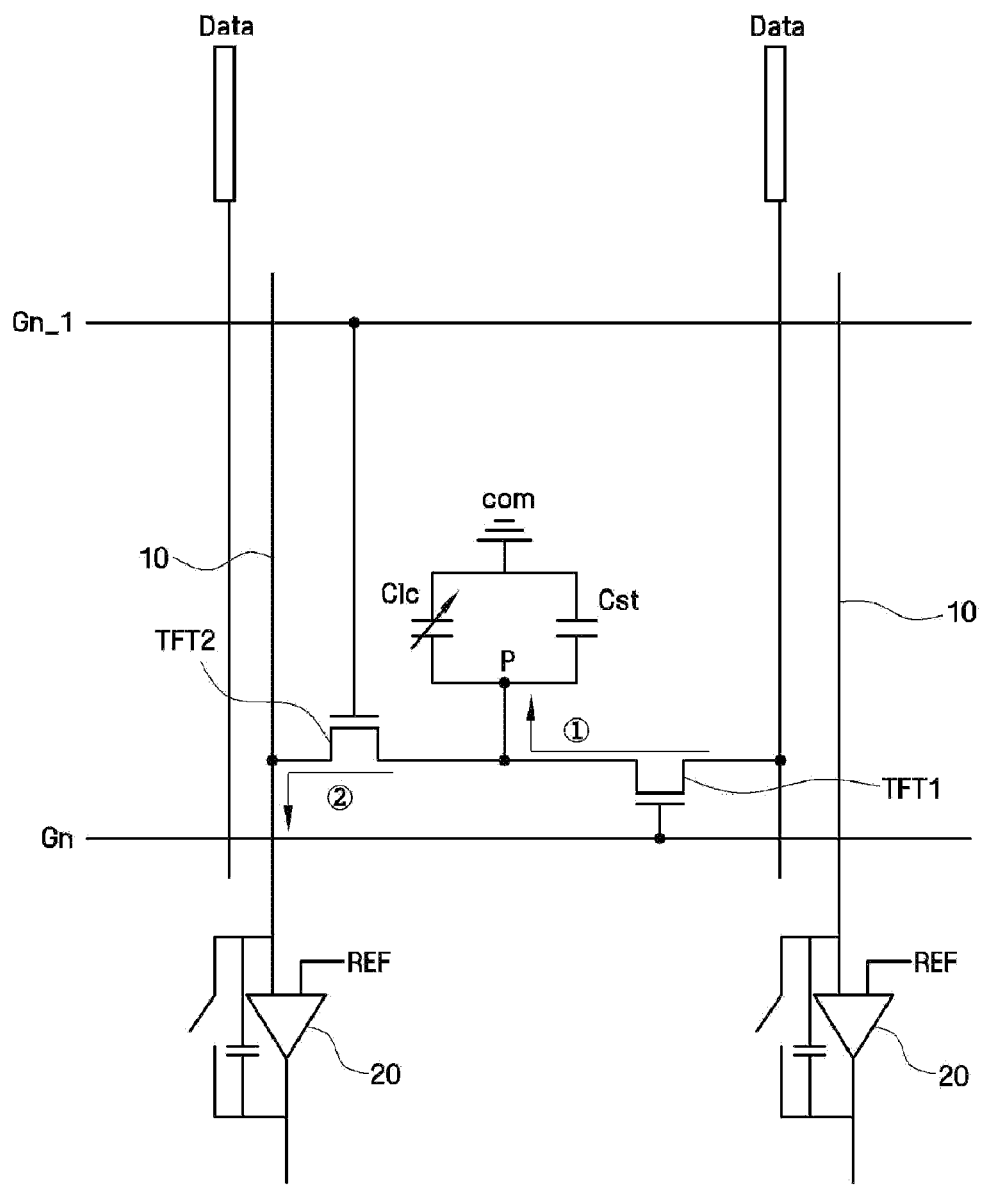
FIG. 4 is a circuit diagram illustrating the configuration of an LCD device having a touch screen function according to a second embodiment of the present invention.

FIG. 4 is a circuit diagram illustrating the configuration of the LCD having the touch screen function according to the second embodiment of the present invention.

As shown in FIG. 4, the LCD device according to the second embodiment of the present invention includes a plurality of gate lines Gn, Gn-1, . . . , that transfer scan signals, and a plurality of data lines Data that intersect the gate lines Gn, Gn-1, . . . and transfer image data.

Further, a plurality of signal lines 10 are insulated from and juxtaposed with the data lines Data.

First and second switching elements TFT1 and TFT2 are formed in each of a plurality of pixel regions in the form of a matrix, which are surrounded by the gate lines Gn, Gn-1, . . . and the data lines Data. At this time, it is preferred that each of the two switching elements be a thin film transistor.

Here, a gate electrode of the first switching element TFT1 is connected to the gate line Gn, a source electrode thereof is connected to the data line Data, and a drain electrode thereof is connected to a pixel electrode P formed on a lower substrate of a liquid crystal panel. Further, a common electrode Com is formed on an upper substrate opposite to the lower substrate.

A liquid crystal material is filled between the pixel electrode P and the common electrode Com and it is equivalently represented as liquid crystal capacitance Clc. Storage capacitance Cst for maintaining a voltage applied to the liquid crystal capacitance Clc is also formed. The liquid crystal capacitance Clc and the storage capacitance (Cst) serve as driving loads of the LCD device.

In such a case, the liquid crystal capacitance Clc is changed due to variation in a liquid crystal cell gap. The second switching elements TFT2 for reading the variation in the liquid crystal capacitance Clc is configured in such a manner that its source electrode is connected to the pixel electrode P, its drain electrode is connected to a signal line 10, and its gate electrode is connected to a previous gate line Gn-1.

The signal lines 10 are connected to signal amplifiers 20, respectively. Each of the signal amplifiers 20 compares a signal applied to each signal line 10 and a reference voltage REF and then amplifies the resultant signal in response to the ON operation of the second switching element TFT2, so that it can be determined whether there is a change in the cell gap at the desired location of the liquid crystal panel.

Now, the operation of the LCD device according to the second embodiment of the present invention will be described.

As a gate-on signal is first applied to the previous gate line Gn-1, the second switching element TFT2 is turned on and thus a pixel voltage charged during a previous frame time is applied to the signal line 10 and then input to the signal amplifier 20.

At this time, the quantity of electric charge Q charged into the pixel can be expressed as the above equation 2.

That is, since the quantity of electric charge is constant, the applied data voltage Vdata varies according to variation in the capacitance of a liquid crystal cell (more specifically, the liquid crystal capacitance).

At this time, the signal amplifier 20 compares the signal applied to the signal line 10 with the reference voltage REF and then amplifies the resultant signal. Thus, the signal amplifier can recognize variation in the charged voltage and accordingly determine whether there is variation in the cell gap at the relevant location of the liquid crystal panel.

Thereafter, as a gate-on signal is applied to a relevant gate line Gn, the first switching element TFT1 is turned on and thus the relevant data voltage Vdata is charged with a pixel voltage.

Therefore, the second embodiment of the present invention has the same effects as the first embodiment of the present invention.

Next, the configuration of a thin film transistor substrate of the LCD device according to the first embodiment of the present invention will be described in detail with reference to FIGS. 5 and 6.

Figure 5:
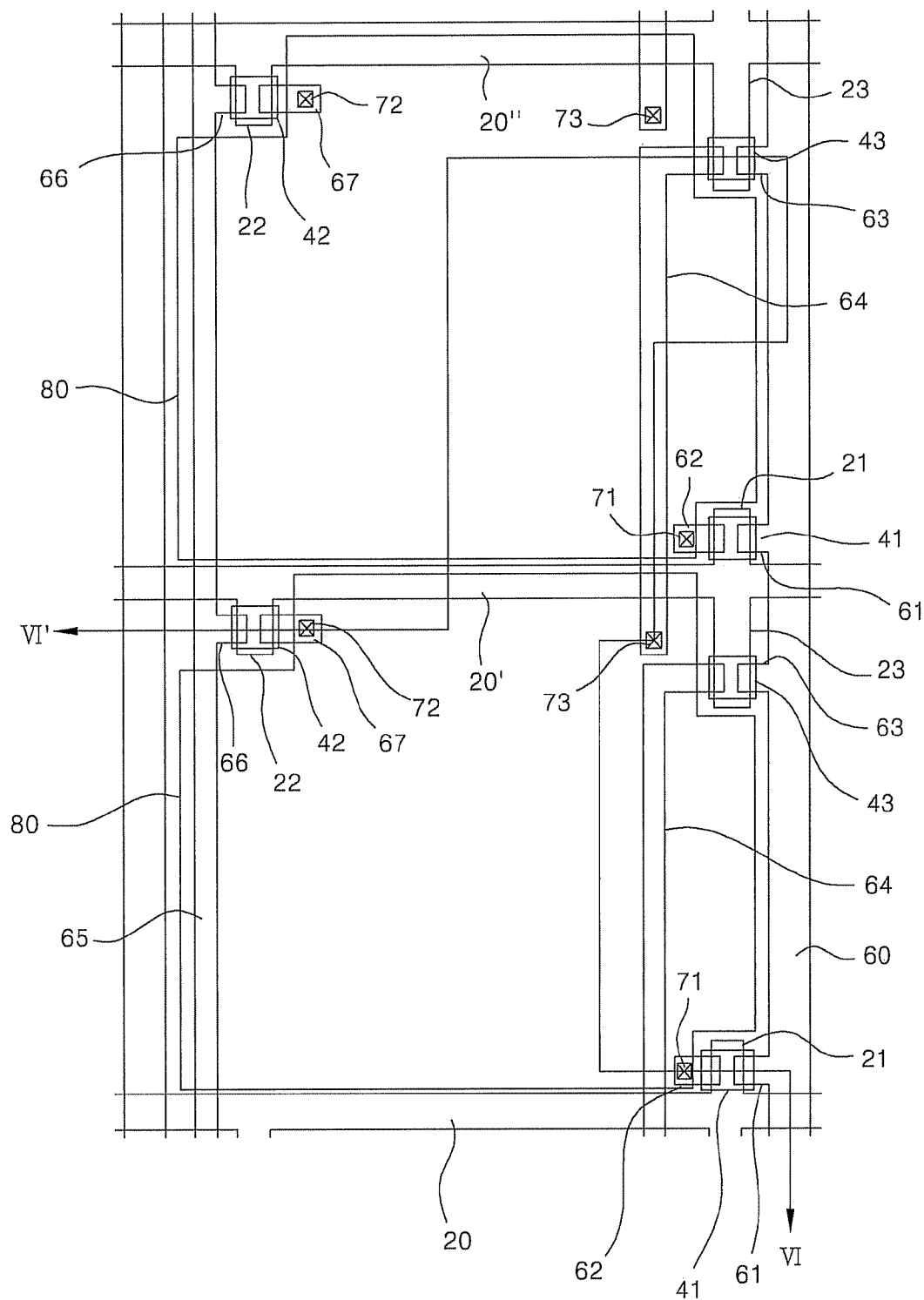
FIG. 5 is a view showing the arrangement of a thin film transistor substrate for the LCD device according to the first embodiment of the present invention.
Figure 6:
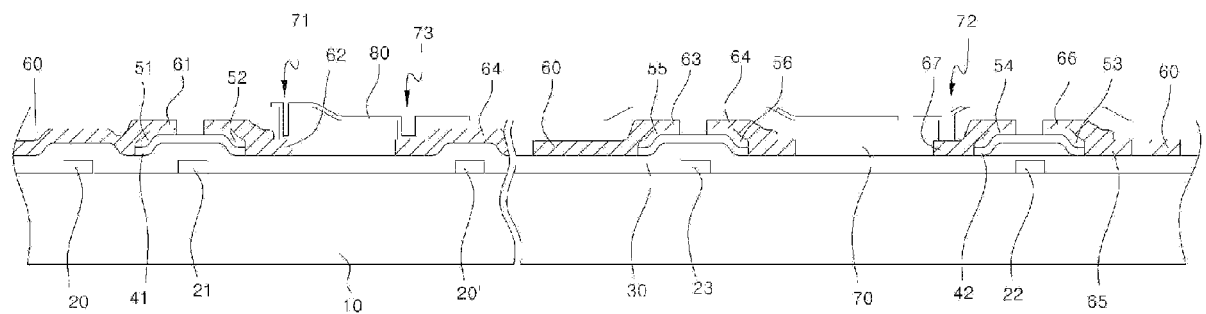
FIG. 6 is a sectional view of the thin film transistor substrate taken along line VI-VI' of FIG. 5.

FIG. 5 is a view showing the arrangement of the thin film transistor substrate for the LCD device according to the first embodiment of the present invention, and FIG. 6 is a sectional view of the thin film transistor substrate taken along line VI-VI' of FIG. 5.

As shown in FIGS. 5 and 6, on an insulating substrate 10 is formed gate wiring 20, 21, 22 and 23 with a thickness of 1000 to 3500 Å which is made of a conductive material such as aluminum or aluminum alloy, chrome or chrome alloy, molybdenum or molybdenum alloy, chrome nitride or molybdenum nitride, etc.

The gate wiring 20, 21, 22 and 23 includes a gate line 20 extending in a horizontal direction and first to third gate electrodes 21, 22 and 23 each of which protrudes from the gate line 20.

For convenience of explanation, the gate line 20 is herein illustrated such that it can be differentiated from a previous gate line 20' and a second previous gate line 20".

The first, second and third gate electrodes 21, 22 and 23 for forming three thin film transistors operating in a single pixel region protrude from the gate line 20, the previous gate line 20' and the second previous gate line 20", respectively.

Meanwhile, the gate wiring 20, 21, 22 and 23 may be configured to have a two or more layer structure. In such a case, it is preferred that at least one layer be formed of a metal material with low resistance.

On the insulating substrate 10, the gate wiring 20, 21, 22 and 23 is covered with a gate insulating film 30 with a thickness of 3500 to 4500 Å which is made of an insulating material such as silicon nitride or silicon oxide.

On the gate insulating film 30 are formed first to third semiconductor patterns 41, 42 and 43 with a thickness of 800 to 1500 Å which overlap the first to third gate electrodes 21, 22 and 23, respectively, and are made of amorphous silicon etc. Ohmic contact layers 51, 52, 53, 54, 55 and 56 with a thickness of 500 to 800 Å which are made of amorphous silicon doped with conductive impurities.

On the ohmic contact layers 51, 52, 53, 54, 55 and 56 and the gate insulating film 30 is formed data wiring 60, 61, 62, 63, 64, 65, 66 and 67 with a thickness of 1500 to 3500 Å, which are made of a conductive material such as aluminum or its alloy, chrome or its alloy, molybdenum or its alloy, chrome nitride or molybdenum nitride, etc.

The data wiring 60 to 67 includes a data line 60 that extends in a vertical direction and intersects the gate line 20 to define a specific pixel region, a signal line 65 that is formed in parallel with the data line 60, a first source electrode 61 that protrudes from the data line 60, a first drain electrode 62 that is formed to face the first source electrode 61, a second source electrode 66 that protrudes from the signal line 65, a second drain electrode 67 that is formed to face the second source electrode 66, a third source electrode 63 that is located above the third gate electrode 23 formed in the second previous gate lines 20" and protrudes from the data line 60, and a third drain electrode 64 that is formed to face the third source electrode 63 and extends from a previous pixel region to a relevant pixel region.

The first source electrode 61 extends up to the top of the ohmic contact layer 51 located on the first semiconductor pattern 41, and the first drain electrode 62 extends from the top of the other ohmic contact layer 52 to the top of the gate insulating film 30 within the pixel region. Further, the second source electrode 66 extends up to the top of the ohmic contact layer 53 located on the second semiconductor pattern 42, and the second drain electrode 67 extends from the top of the other ohmic contact layer 54 to the top of the gate insulating film 30 within the pixel region. Furthermore, the third source electrode 63 extends up to the top of the ohmic contact layer 55 located on the third semiconductor pattern 43, and the third drain electrode 64 extends from the top of the other ohmic contact layer 56 to the top of the gate insulating film 30 within the previous and relevant pixel regions.

At this time, the data wiring 60 to 67 may be formed to have a two or more layer structure. In such a case, at least one layer is preferably formed of a metal material with low resistance.

The data wiring 60 to 67 and the semiconductor patterns 41, 42 and 43 are covered with a protection film 70 made of an insulating material such as silicon nitride or silicon oxide.

First to third contact holes 71, 72 and 73 for allowing the first, second and third drain electrodes 62, 64 and 67 to be exposed in a relevant pixel region are formed in the protection film 70. Further, a pixel electrode 80, which is connected to the first, second and third drain electrodes 62, 64, and 67 through the first to third contact holes 71, 72 and 73, is formed on the protection film 70. Here, the pixel electrode 80 is made of a transparent conductive material such as ITO (indium tin oxide) or IZO (indium zinc oxide).

Now, a method of fabricating a thin film transistor substrate according to the first embodiment of the present invention will be described with reference to FIGS. 7A to 10B together with FIGS. 5 and 6.

Figure 7A:
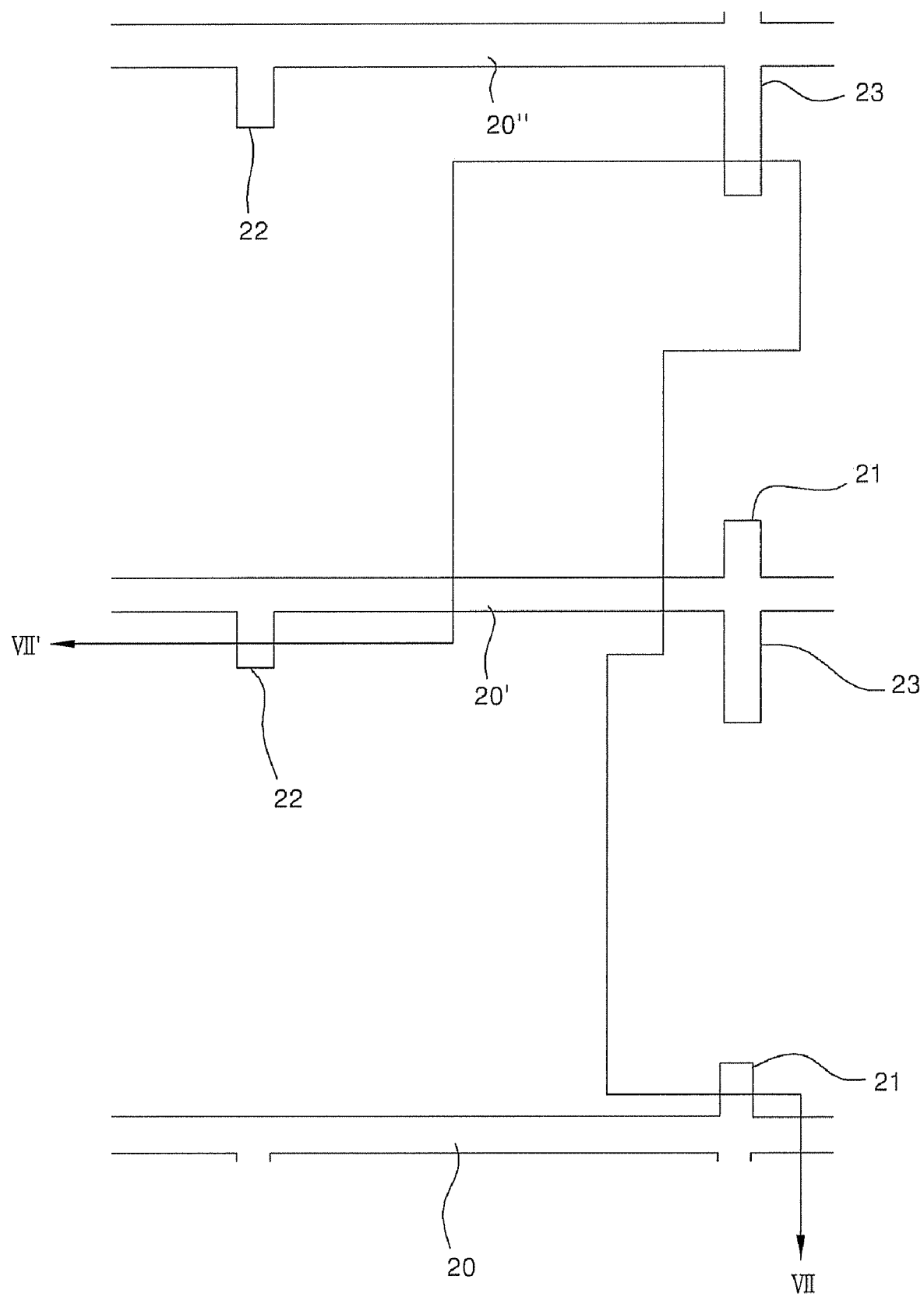
FIG. 7A is a view showing the arrangement of a substrate in a first step of fabricating a thin film transistor substrate for the LCD device according to the first embodiment of the present invention.
Figure 7B:
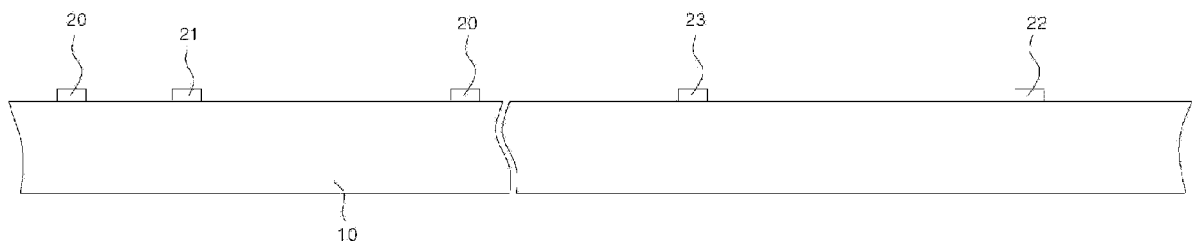
FIG. 7B is a sectional view of the substrate taken along line VII-VII' of FIG. 7A.

As shown in FIGS. 7A and 7B, a metal layer for gate wiring is deposited on the insulating substrate 10 and then patterned by a photolithographic etching process, in order to form the gate wiring 20, 21, 22 and 23 on the insulating substrate 10. At this time, the gate wiring 20, 21, 22 and 23 includes the gate line 20 and the first to third gate electrodes 21, 22 and 23.

Figure 8A:
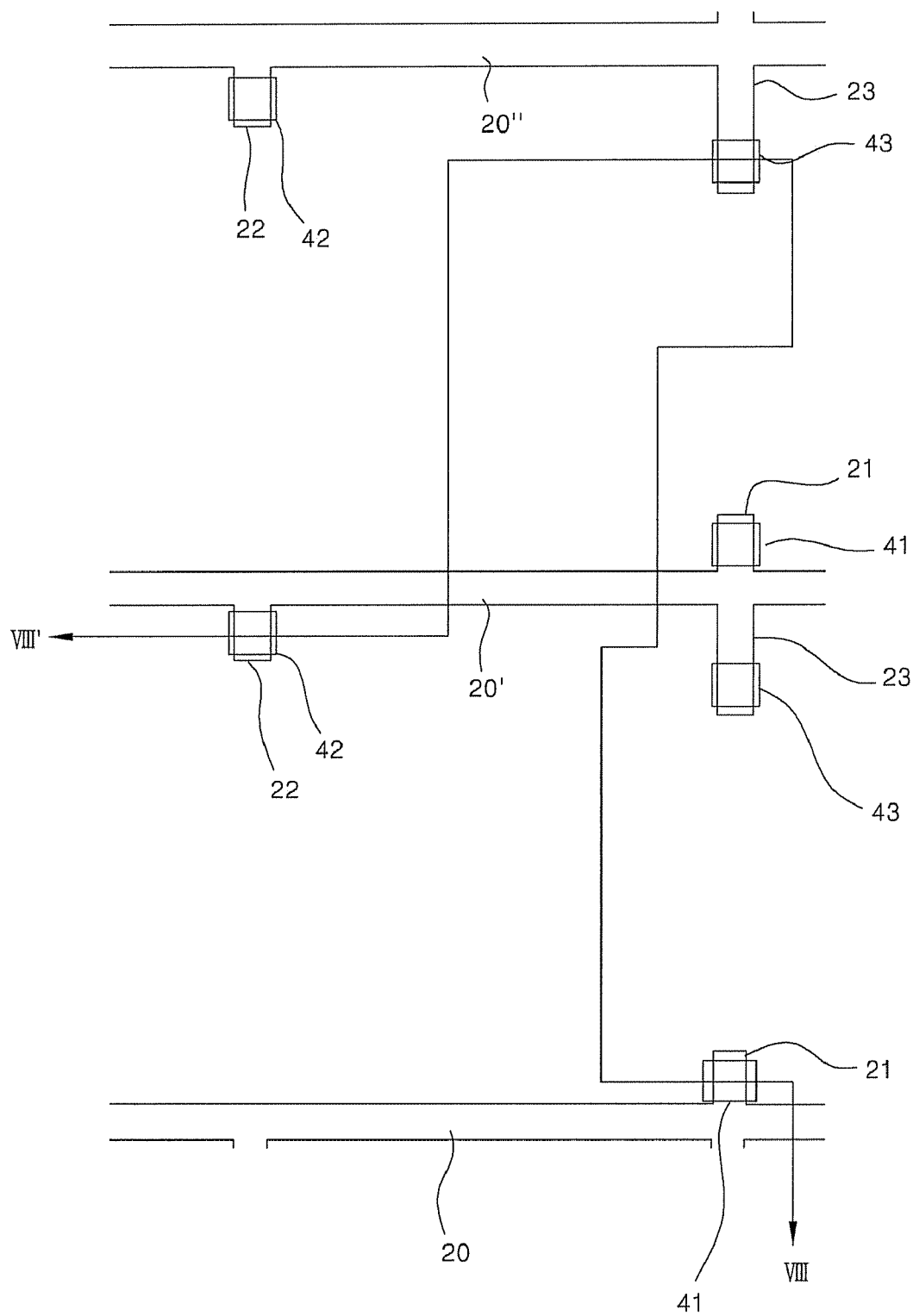
FIG. 8A is a view showing the arrangement of the substrate in the next fabrication step of FIG. 7A.
Figure 8B:
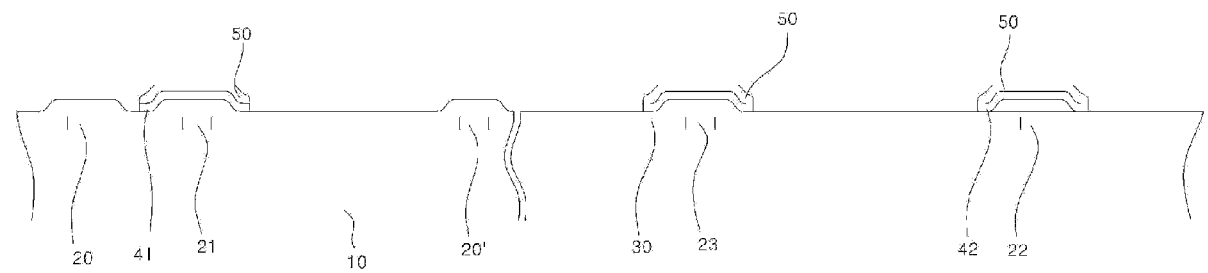
FIG. 8B is a sectional view of the substrate taken along line VIII-VIII' of FIG. 8A.

As shown in FIGS. 8A and 8B, the gate insulating film 30 made of an insulating material such as silicon nitride is deposited on the insulating substrate 10 to cover the gate wiring 20, 21, 22 and 23.

Thereafter, an amorphous silicon layer and another amorphous silicon layer doped with conductive impurities are sequentially formed on the gate insulating film 30 and then patterned by a photolithographic etching process to form the first to third semiconductor patterns 41, 42 and 43 and the ohmic contact layer pattern 50.

Figure 9A:
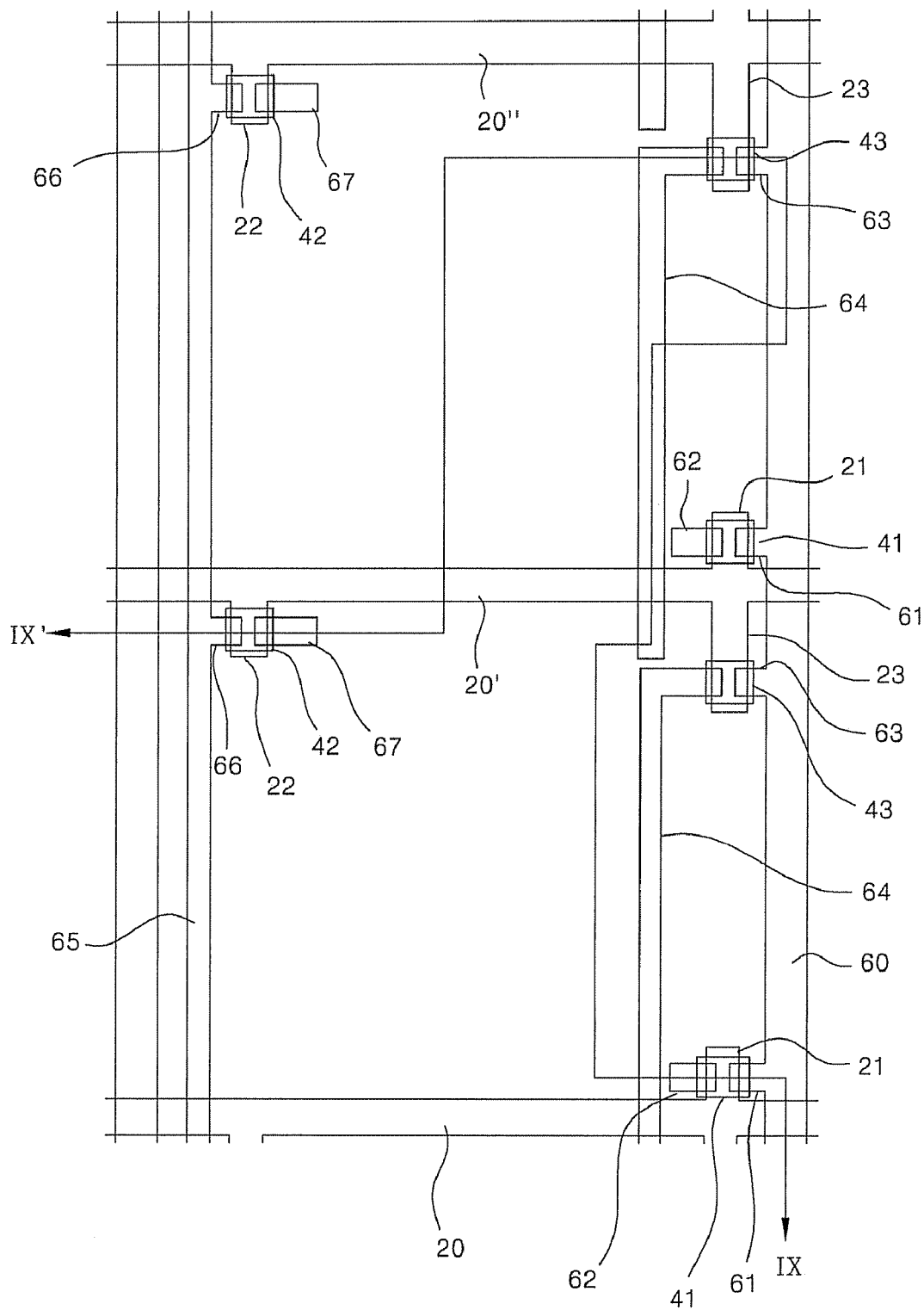
FIG. 9A is a view showing the arrangement of the substrate in the next fabrication step of FIG. 8B.
Figure 9B:
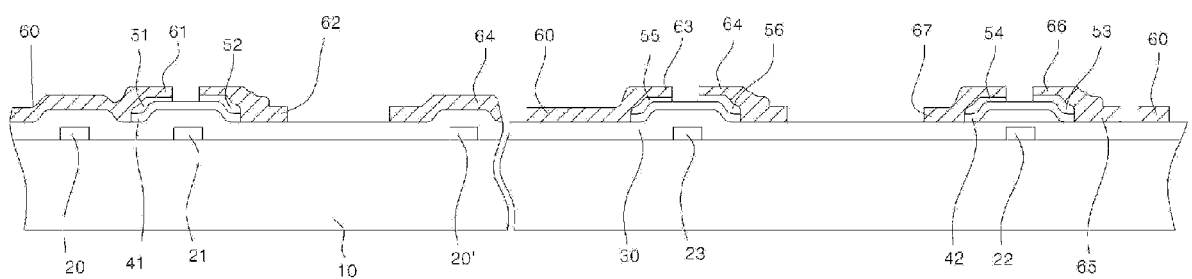
FIG. 9B is a sectional view of the substrate taken along line IX-IX' of FIG. 9A.

As shown in FIGS. 9A and 9B, a metal layer for data wiring is deposited over the entire exposed surface of the substrate and then pattered by a photolithographic etching process to form the data wiring 60 to 67. The data wiring 60 to 67 includes the data line 60, the signal line 65, the first to third source electrodes 61, 63 and 66, and the first to third drain electrodes 62, 64 and 67.

Thereafter, the ohmic contact layer pattern 50 is etched by using the first to third source electrodes 61, 63 and 66 and the first to third drain electrodes 62, 64 and 67 as a mask. At this time, the ohmic contact layer pattern 50 is divided into the ohmic contact layer 51 in contact with the first source electrode 61 and an ohmic contact layer 52 in contact with the first drain electrode 62. Similarly, the ohmic contact layer pattern 50 is also divided into the ohmic contact layer 53 in contact with the second source electrode 66 and the ohmic contact layer 54 in contact with the second drain electrode 67. Furthermore, the ohmic contact layer pattern 50 is divided into the ohmic contact layer 55 in contact with the third source electrode 63 and the ohmic contact layer 56 in contact with the third drain electrode 64.

Figure 10A:
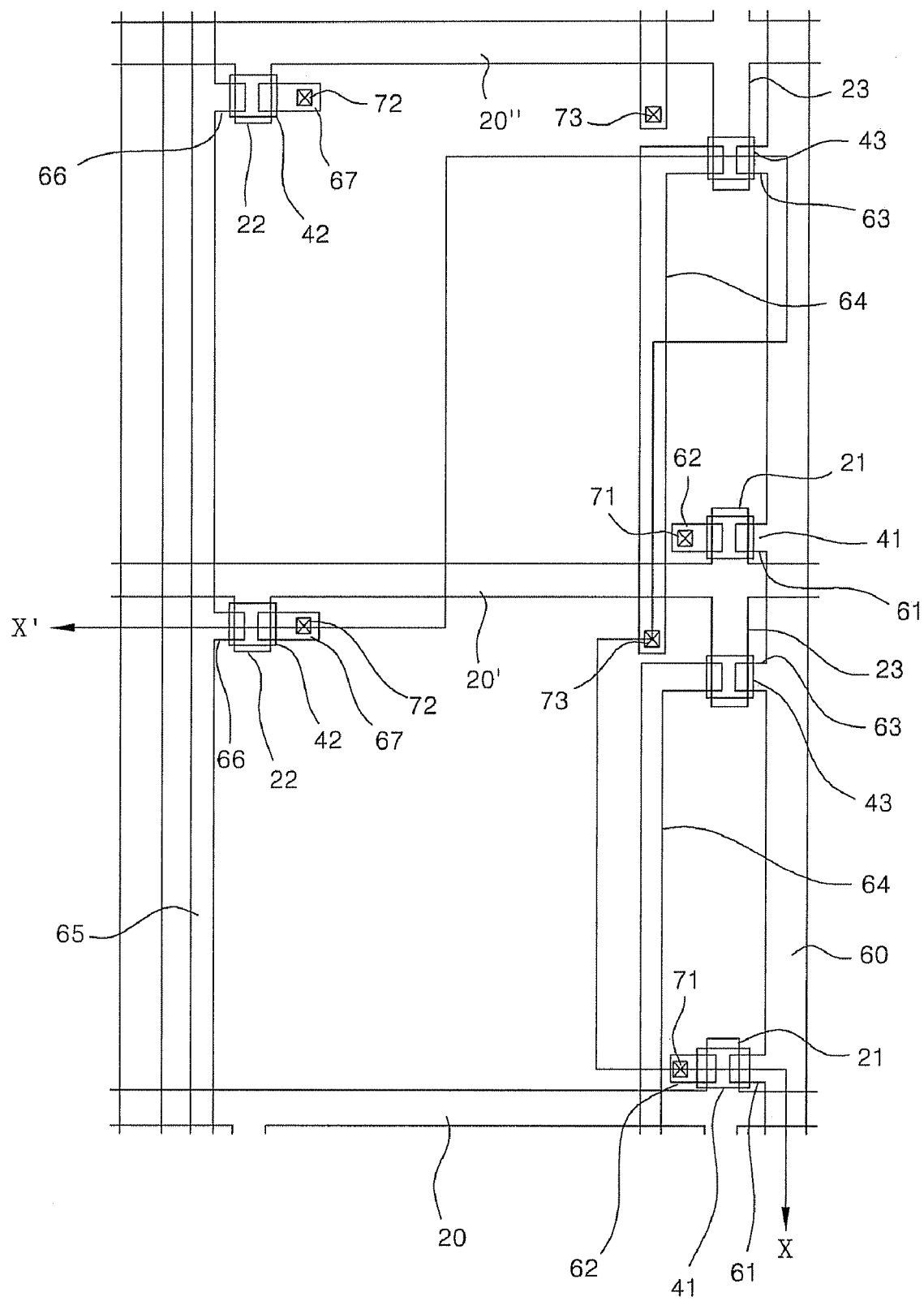
FIG. 10A is a view showing the arrangement of the substrate in the next fabrication step of FIG. 9A.
Figure 10B:
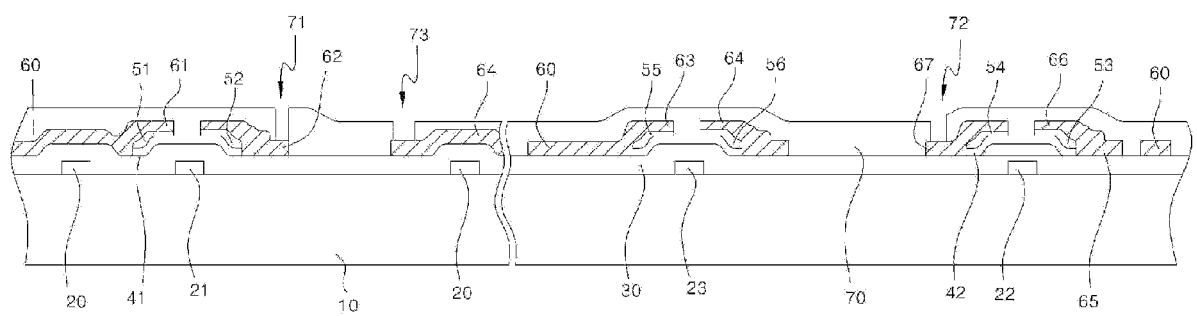
FIG. 10B is a sectional view of the substrate taken along line X-X' of FIG. 10A.

Referring to FIGS. 10A and 10B, the protection film 70 is subsequently formed over the entire substrate including the data wiring 60 to 67 and the semiconductor patterns 41, 42 and 43 with the silicon nitride, silicon oxide or the like.

The first to third contact holes 71, 72 and 73 through which the first to third drain electrodes 62, 64 and 67 are exposed in the relevant pixel region are then formed by patterning the protection film 70 through a photolithographic etching process.

As illustrated in FIGS. 5 and 6, a transparent conductive layer made of ITO or IZO is deposited over the entire exposed surface of the substrate and then patterned by a photolithographic etching process so that the pixel electrode 80 connected to the first to third drain electrodes 62, 64 and 67 through the first to third contact holes 71, 72 and 73 can be formed on each pixel region.

Now, the configuration of a thin film transistor substrate of the LCD device according to the second embodiment of the present invention will be described in detail with reference to FIGS. 11 and 12.

Figure 11:
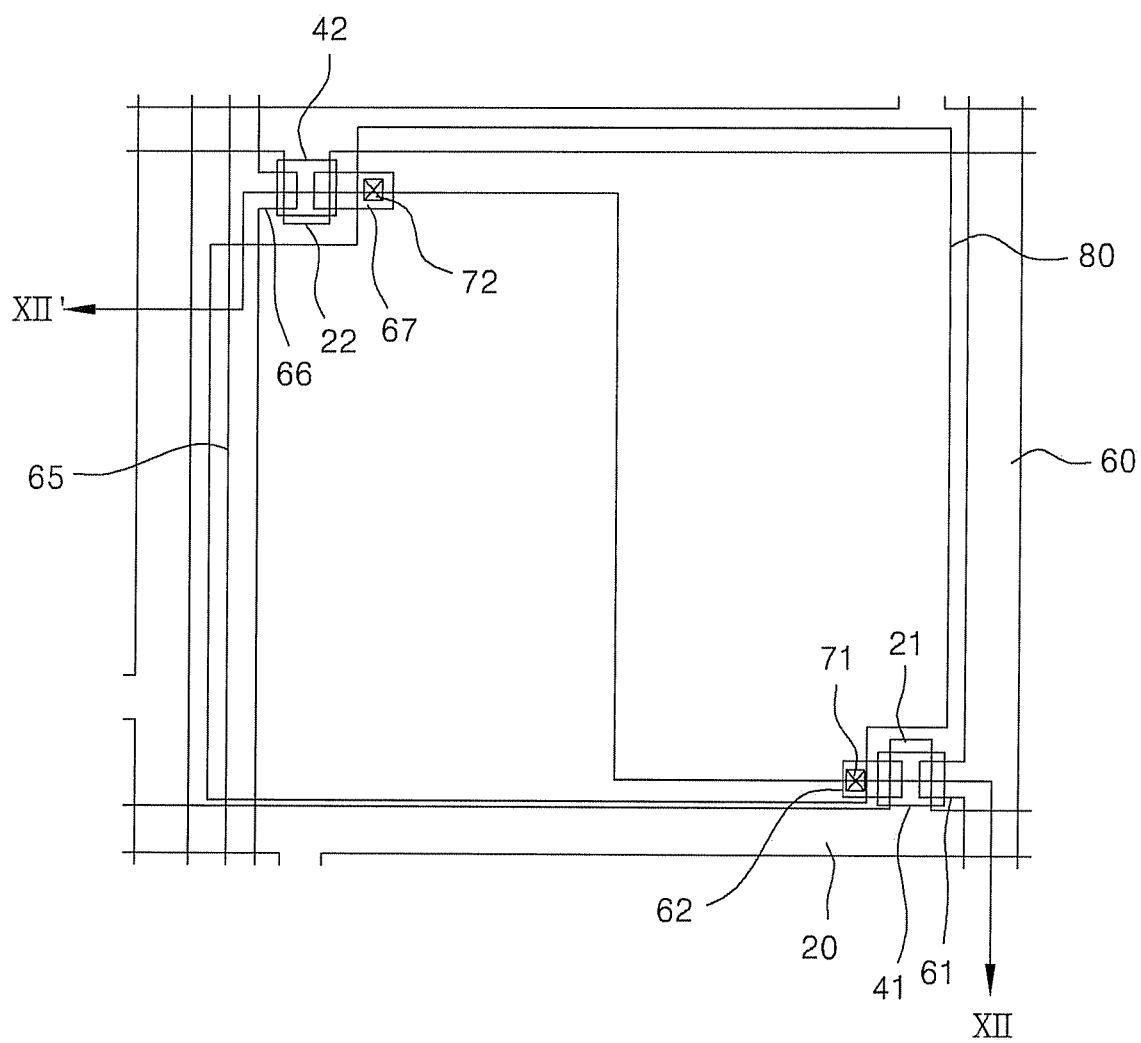
FIG. 11 is a view showing the arrangement of a thin film transistor substrate for the LCD device according to the second embodiment of the present invention.
Figure 12:
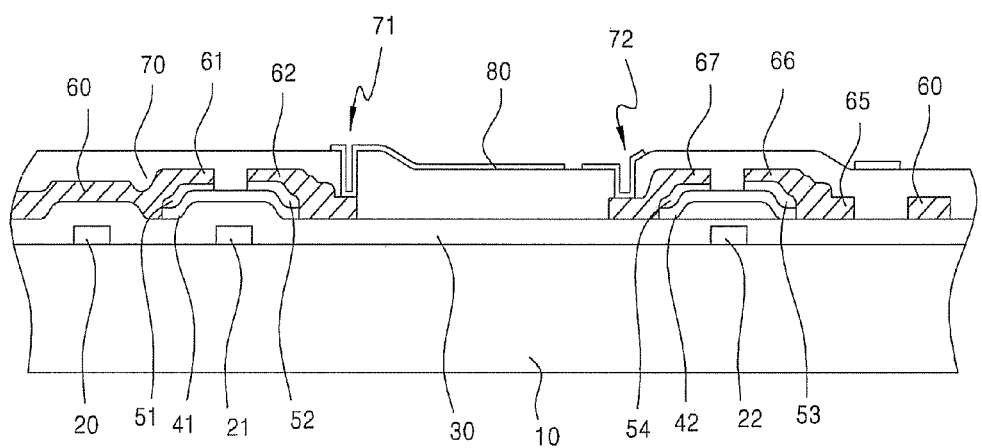
FIG. 12 is a sectional view of the thin film transistor substrate taken along line XII-XII' of FIG. 11.

FIG. 11 is a view showing the arrangement of the thin film transistor substrate for the LCD device according to the second embodiment of the present invention, and FIG. 12 is a sectional view of the thin film transistor substrate taken along line XII-XII' of FIG. 11.

Referring to these figures, on the insulating substrate 10 is formed gate wiring 20, 21 and 22 with a thickness of 1000 to 3500 Å which is made of a conductive material such as aluminum or its alloy, chrome or its alloy, molybdenum or its alloy, chrome nitride or molybdenum nitride, etc.

The gate wiring 20, 21 and 22 includes a gate line 20 extending in a horizontal direction and first and second gate electrodes 21 and 22 each of which protrudes from the gate line 20.

At this time, the opposite first and second gate electrodes 21 and 22 for forming two thin film transistors operating in a single pixel region protrude from the gate line and the previous gate line, respectively.

The gate wiring 20, 21 and 22 may be configured to have a two or more layer structure. In such a case, it is preferred that at least one layer be formed of a metal material with low resistance.

On the insulating substrate 10, the gate wiring 20, 21 and 22 is covered with a gate insulating film 30 with a thickness of 3500 to 4500 Å which is made of an insulating material such as silicon nitride or silicon oxide.

On the gate insulating film 30 are formed first and second semiconductor patterns 41 and 42 with a thickness of 800 to 1500 Å which overlap the first and second gate electrodes 21 and 22, respectively, and are made of amorphous silicon, etc. Ohmic contact layers 51, 52, 53 and 54 with a thickness of 500 to 800 Å which are made of amorphous silicon doped with conductive impurities.

On the ohmic contact layers 51, 52, 53 and 54 and the gate insulating film 30 is formed data wiring 60, 61, 62, 65, 66 and 67 with a thickness of 1500 to 3500 Å, which are made of a conductive material such as aluminum or its alloy, chrome or its alloy, molybdenum or its alloy, chrome nitride or molybdenum nitride, etc.

The data wiring 60, 61, 62, 65, 66 and 67 includes a data line 60 that extends in a vertical direction and intersects the gate line 20 to define a specific pixel region, a signal line 65 that is formed in parallel with the data line 60, a first source electrode 61 that protrudes from the data line 60, a first drain electrode 62 that is formed to face the first source electrode 61, a second source electrode 66 that protrudes from the signal line 65, and a second drain electrode 67 that is formed to face the second source electrode 66.

The first source electrode 61 extends up to above the ohmic contact layer 51 located on the first semiconductor pattern 41, and the first drain electrode 62 extends from above the other ohmic contact layer 52 to above the gate insulating film 30 within the pixel region. Further, the second source electrode 66 extends up to above the ohmic contact layer 53 located on the second semiconductor pattern 42, and the second drain electrode 67 extends from above the other ohmic contact layer 54 to above the gate insulating film 30 within the pixel region.

At this time, the data wiring 60, 61, 62, 65, 66 and 67 may be formed to have a two or more layer structure. In such a case, at least one layer is preferably formed of a metal material with low resistance.

The data wiring 60, 61, 62, 65, 66 and 67 and the semiconductor patterns 41 and 42 are covered with a protection film 70 made of an insulating material such as silicon nitride or silicon oxide.

First and second contact holes 71 and 72 through which the first and second drain electrodes 62 and 67 are exposed in a relevant pixel region are formed in the protection film 70. Further, a pixel electrode 80, which is connected to the first and second drain electrodes 62 and 67 through the first and second contact holes 71 and 72, is formed on the protection film 70. Here, the pixel electrode 80 is made of a transparent conductive material such as ITO or IZO.

Further, a method of fabricating a thin film transistor substrate according to the second embodiment of the present invention will be described with reference to FIGS. 13A to 16B together with FIGS. 11 and 12.

Figure 13A:
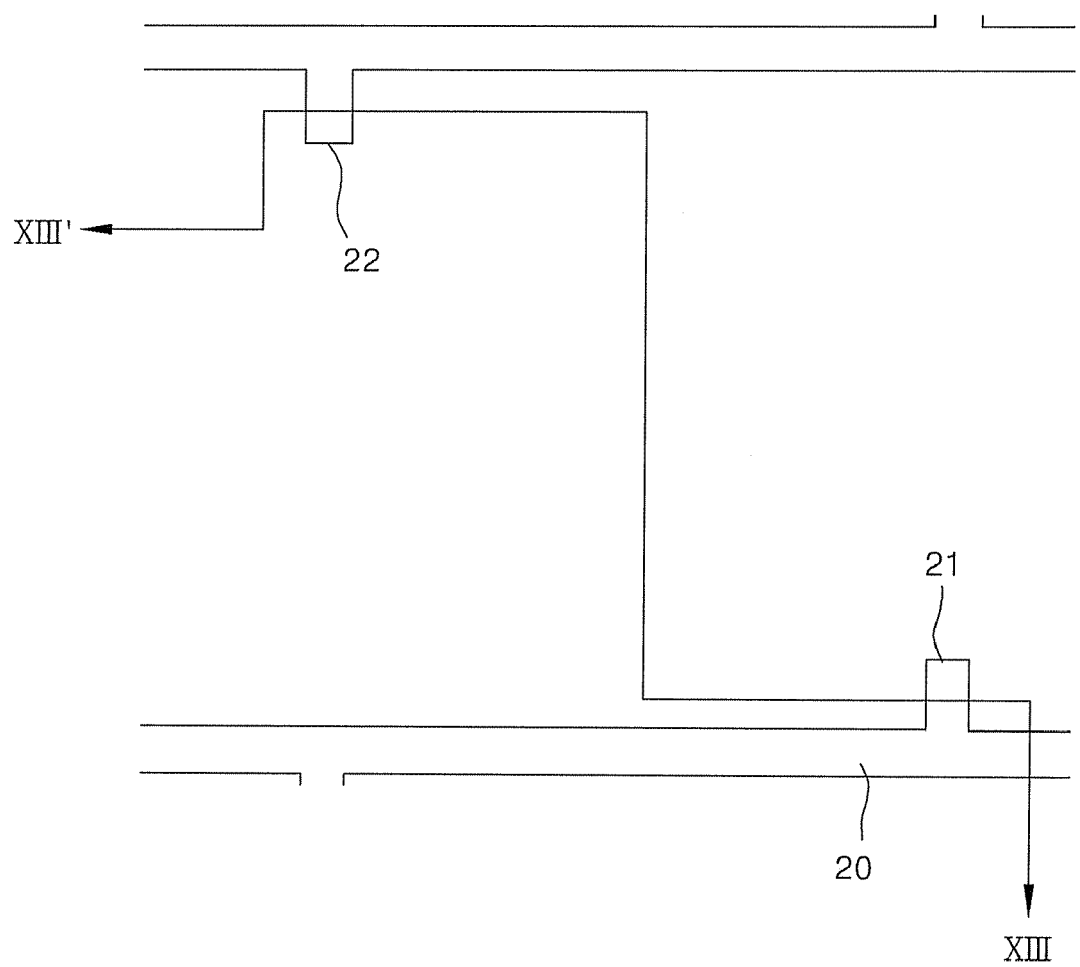
FIG. 13A is a view showing the arrangement of a substrate in a first step of fabricating a thin film transistor substrate for the LCD device according to the second embodiment of the present invention.
Figure 13B:
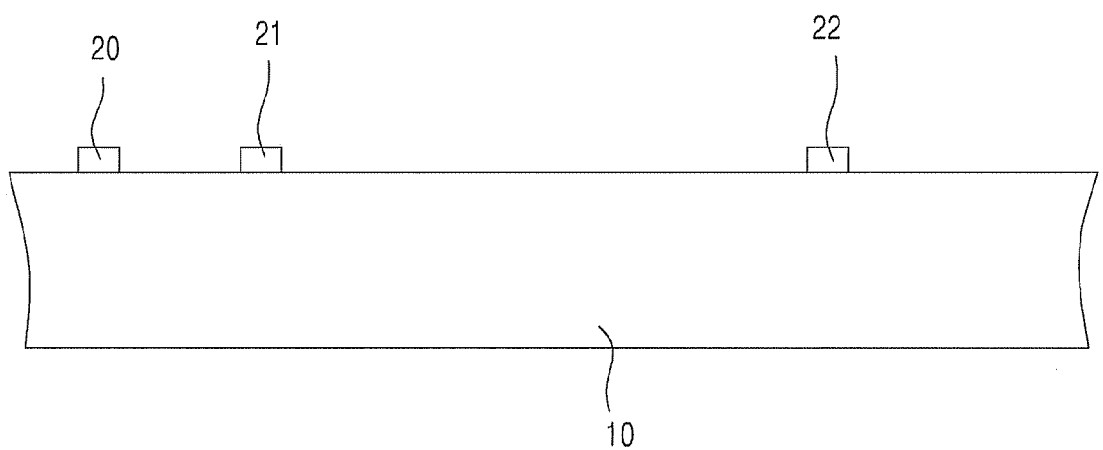
FIG. 13B is a sectional view of the substrate taken along line XIII-XIII' of FIG. 13A.

As shown in FIGS. 13A and 13B, a metal layer for gate wiring is deposited on the insulating substrate 10 and then patterned by a photolithographic etching process, in order to form the gate wiring 20, 21 and 22 on the insulating substrate 10. At this time, the gate wiring 20, 21 and 22 includes the gate line 20 and the first and second gate electrodes 21 and 22.

Figure 14A:
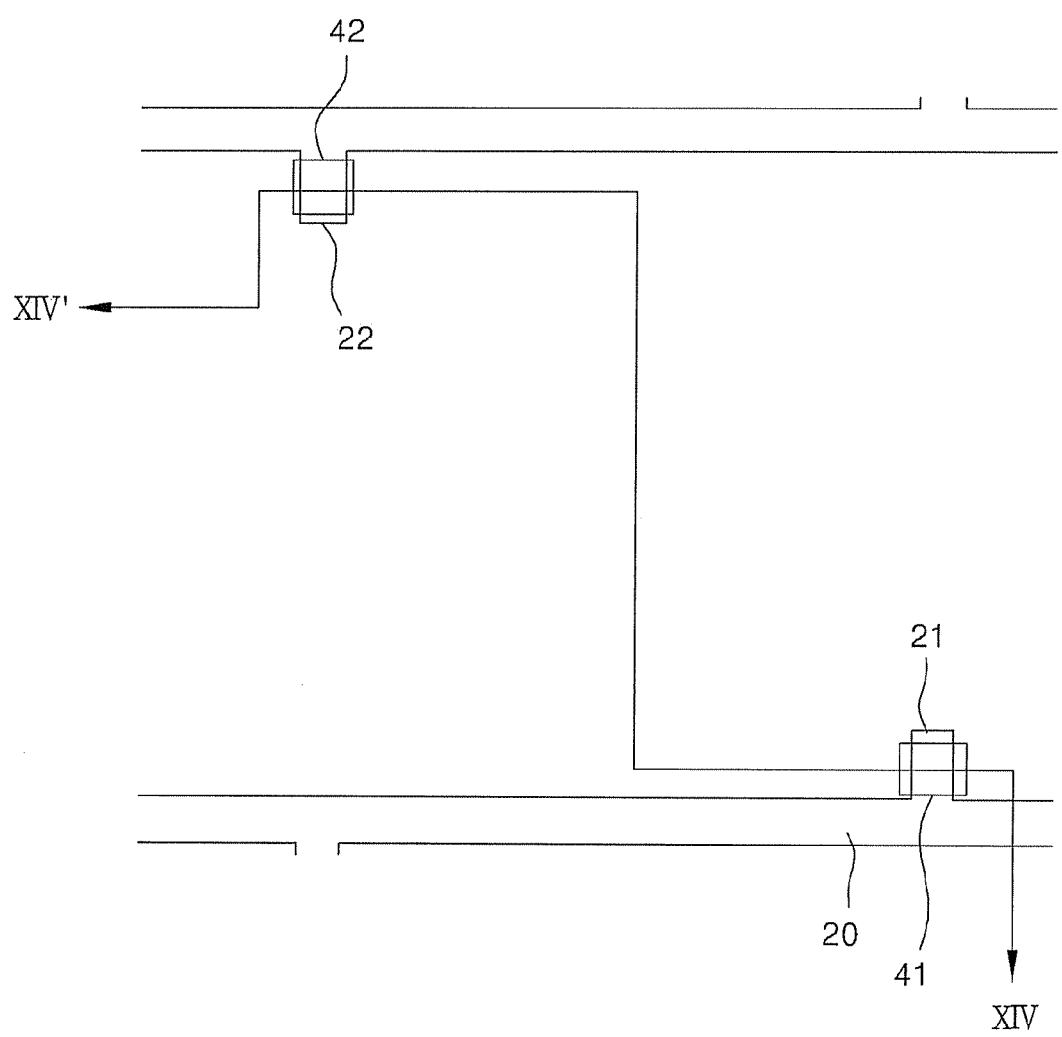
FIG. 14A is a view showing the arrangement of the substrate in the next fabrication step of FIG. 13A.
Figure 14B:
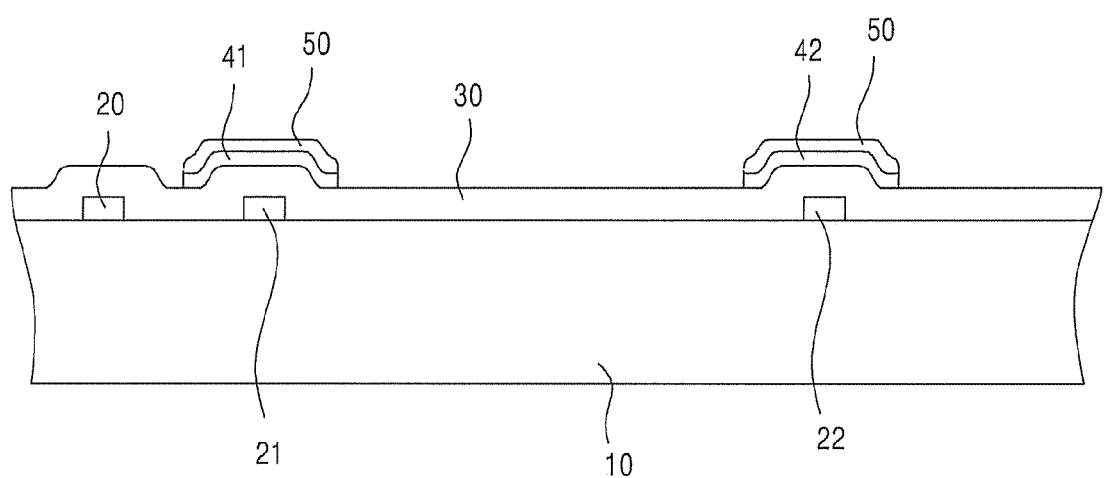
FIG. 14B is a sectional view of the substrate taken along line XIV-XIV' of FIG. 14A.

As shown in FIGS. 14A and 14B, the gate insulating film 30 made of an insulating material such as silicon nitride is deposited on the insulating substrate 10 to cover the gate wiring 20, 21 and 22.

Thereafter, an amorphous silicon layer and another amorphous silicon layer doped with conductive impurities are sequentially formed on the gate insulating film 30 and then patterned by a photolithographic etching process to form the first and second semiconductor patterns 41 and 42 and the ohmic contact layer pattern 50.

Figure 15A:
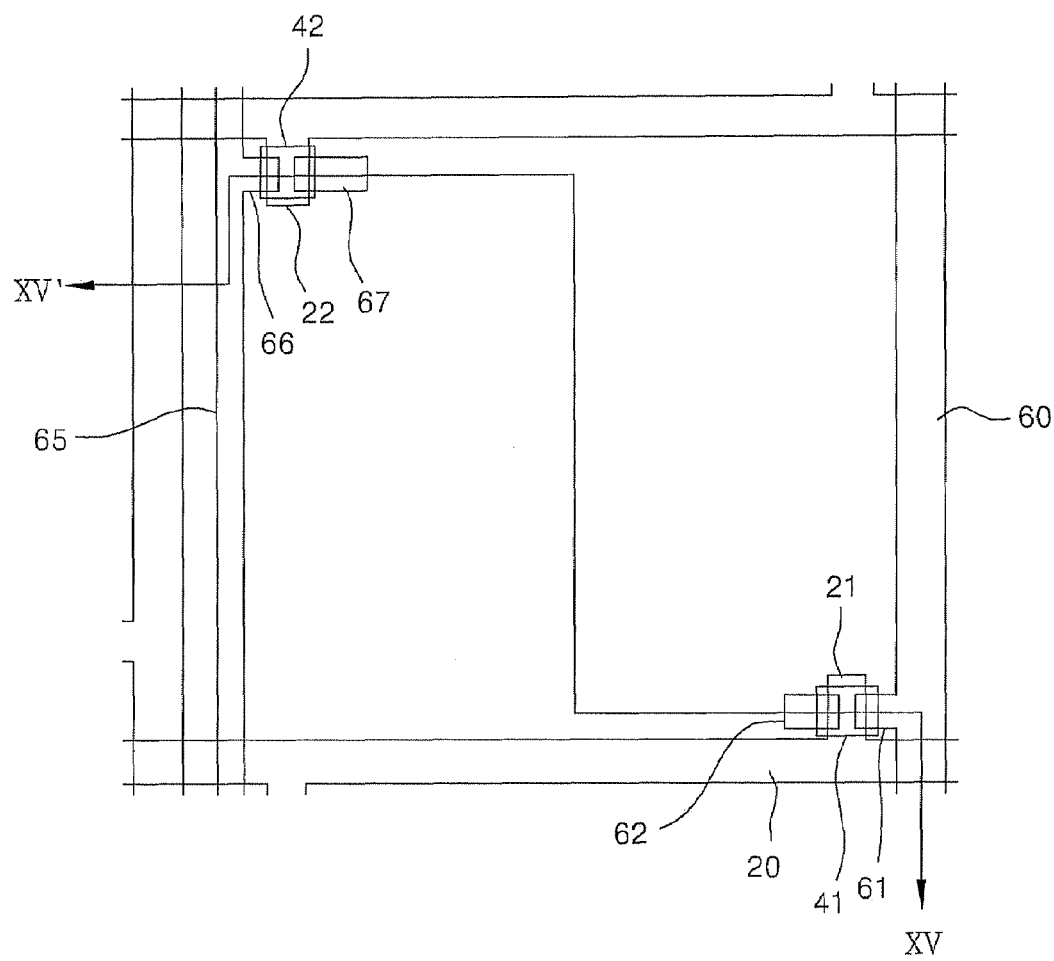
FIG. 15A is a view showing the arrangement of the substrate in the next fabrication step of FIG. 14A.
Figure 15B:
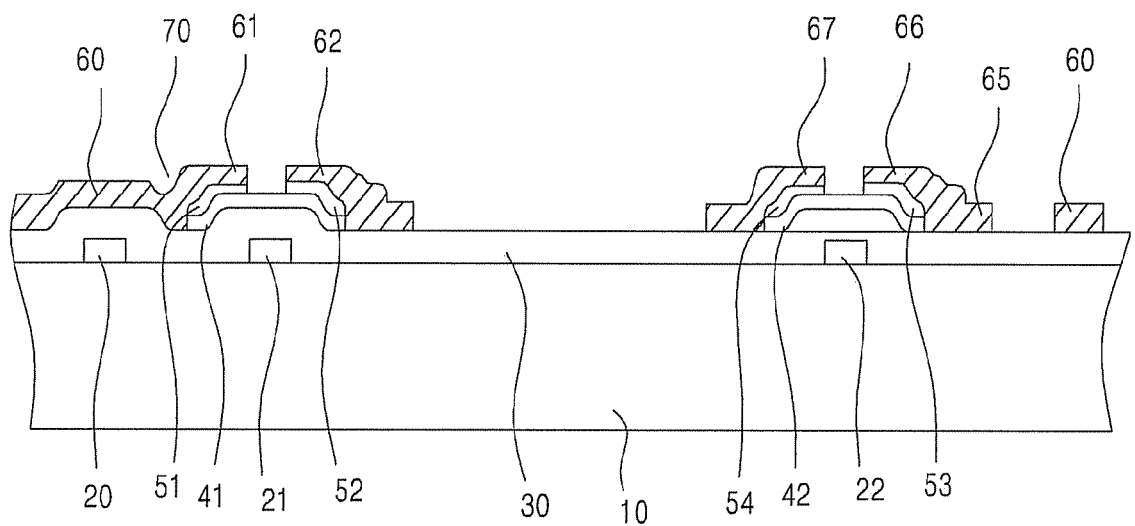
FIG. 15B is a sectional view of the substrate taken along line XV-XV' of FIG. 15A.

As shown in FIGS. 15A and 15B, a metal layer for data wiring is deposited over the entire exposed surface of the substrate and then pattered by a photolithographic etching process to form the data wiring 60, 61, 62, 65, 66 and 67. The data wiring 60, 61, 62, 65, 66 and 67 includes the data line 60, the signal line 65, the first and second source electrodes 61 and 66, and the first and second drain electrodes 62 and 67.

Thereafter, the ohmic contact layer pattern 50 is etched by using the first and second source electrodes 61 and 66 and the first and second drain electrodes 62 and 67 as a mask. At this time, the ohmic contact layer pattern 50 is divided into the ohmic contact layer 51 in contact with the first source electrode 61 and an ohmic contact layer 52 in contact with the first drain electrode 62. Similarly, the ohmic contact layer pattern 50 is also divided into the ohmic contact layer 53 in contact with the second source electrode 66 and the ohmic contact layer 54 in contact with the second drain electrode 67.

Figure 16A:
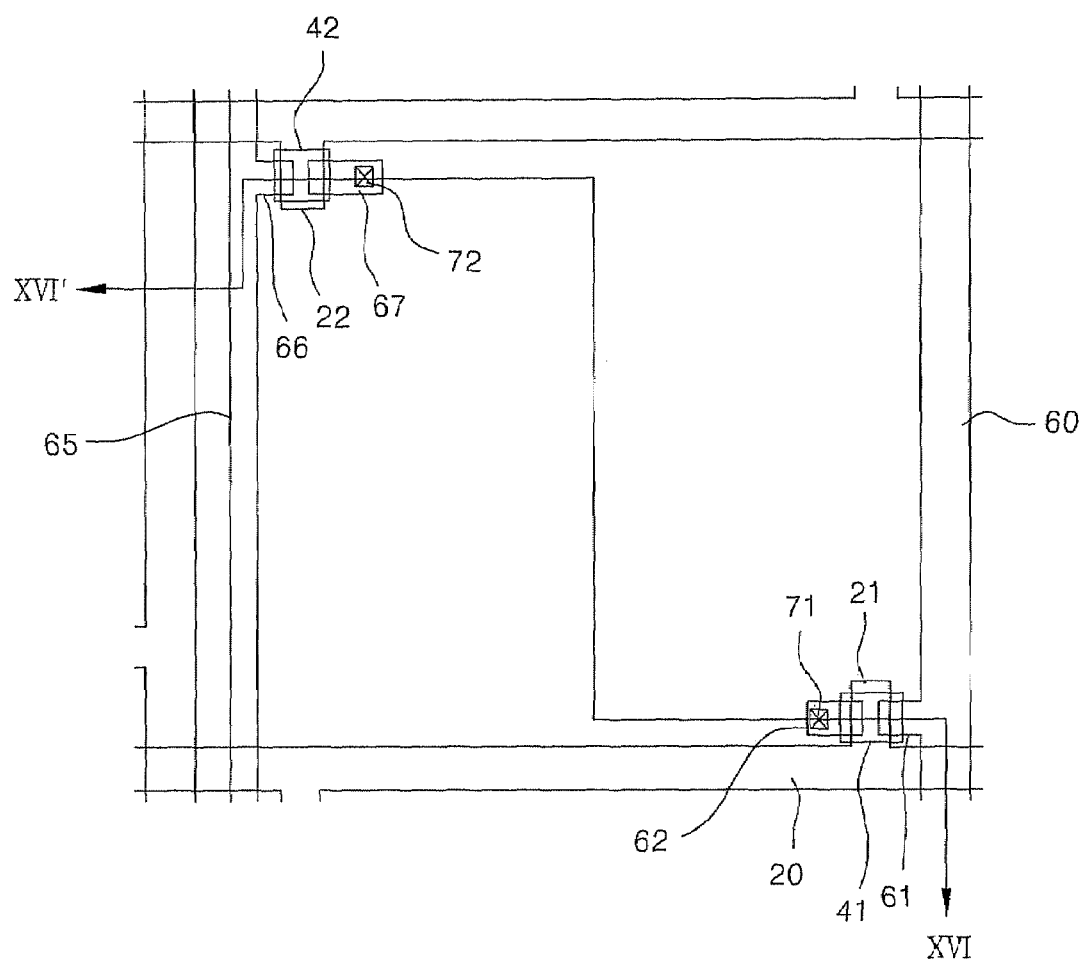
Figure 16B:
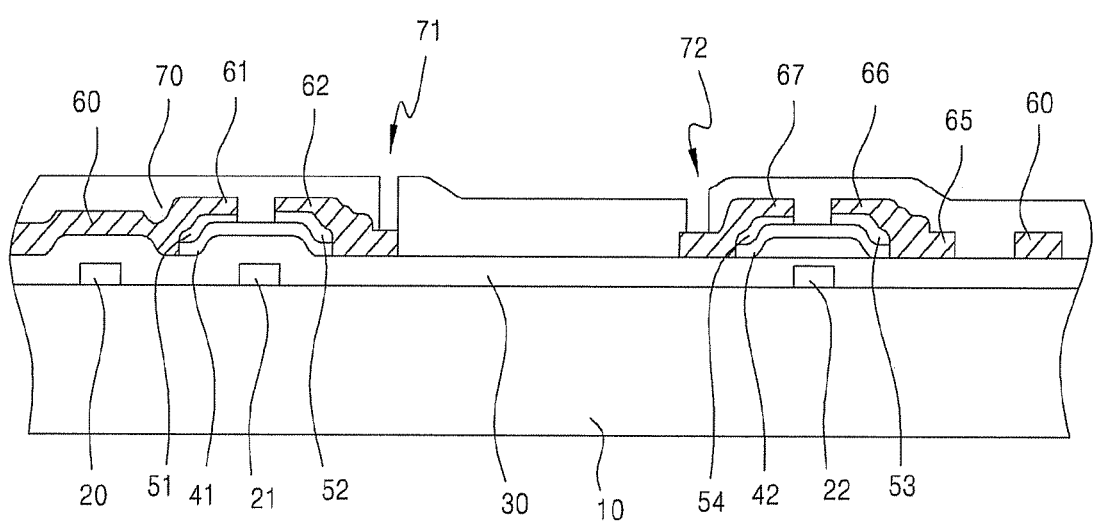
FIG. 16B is a sectional view of the substrate taken along line XVI-XVI' of FIG. 16A.

Referring to FIGS. 16A and 16B, the protection film 70 is subsequently formed over the entire substrate including the data wiring 60, 61, 62, 65, 66 and 67 and the semiconductor patterns 41 and 42 with the silicon nitride, silicon oxide or the like.

The first and second contact holes 71 and 72 through which the first and second drain electrodes 62 and 67 are exposed in the relevant pixel region are then formed by patterning the protection film 70 through a photolithographic etching process.

As illustrated in FIGS. 11 and 12, a transparent conductive layer made of ITO or IZO is deposited over the entire exposed surface of the substrate and then patterned by a photolithographic etching process so that the pixel electrode 80 connected to the first and second drain electrodes 62 and 67 through the first and second contact holes 71 and 72 can be formed on each pixel region.

According to the present invention, two or more switching means are provided every pixel region to read variation in a liquid crystal cell gap. Therefore, the present invention has an advantage in that a touch screen function can be implemented even without attaching an additional touch panel to the LCD device.

Although the present invention has been described in connection with the preferred embodiment thereof, it is not limited thereto. Accordingly, it will be apparent to those skilled in the art that various changes and modifications can be made thereto without departing from the scope and spirit of the present invention defined by the appended claims.

The invention claimed is:

1. A liquid crystal display (LCD) device having a touch screen function, comprising:
   a plurality of gate lines that transfer scan signals;
   a plurality of data lines that intersect the gate lines;
   a plurality of signal lines that are formed substantially in parallel with the data lines; and
   three switching elements that are formed in each of a plurality of pixel regions in the form of a matrix, which are surrounded by the gate lines and the data lines;
   wherein three switching elements are formed in each pixel region, and wherein the first switching element among them is turned on to charge a relevant data voltage when a gate-on signal is applied to a relevant gate line,
   the third switching element is turned on to charge a previous data voltage when the gate-on signal is applied to a previous gate line, and
   the second switching element is turned on to apply the previous data voltage to the signal line when the gate-on signal is applied to another previous gate line.

2. A liquid crystal display (LCD) device having a touch screen function, comprising:
   a plurality of gate lines that transfer scan signals;
   a plurality of data lines that intersect the gate lines;
   a plurality of signal lines that are formed substantially in parallel with the data lines; and
   two switching elements that are formed in each of a plurality of pixel regions in the form of a matrix, which are surrounded by the gate lines and the data lines;
   wherein two switching elements are formed in each pixel region, and wherein the first switching element is turned on to charge a relevant data voltage when a gate-on signal is applied to a relevant gate line, and
   the second switching element is turned on to apply the data voltage charged during a previous frame time to the signal line when the gate-on signal is applied to a previous gate line.

3. An LCD device having a touch screen function, comprising:
   an insulating substrate;
   a gate line formed on the insulating substrate;
   a gate insulating film covered on the gate line;
   a data line that intersects the gate line and defines a pixel region on the gate insulating film;
   a signal line formed substantially in parallel with the data line;
   a first thin film transistor electrically connected to both the gate line and the data line;
   a second thin film transistor electrically connected to both a previous gate line and the signal line;
   a third thin film transistor electrically connected to another previous gate line and the data line;
   a protection film that covers the first to third thin film transistors, the data line and the signal line, and includes first to third contact holes through which each of drain electrodes of the first to third thin film transistors is exposed; and
   a pixel electrode that is connected to the first to third drain electrodes through the first to third contact holes.

4. The LCD device as claimed in claim 3, wherein the third thin film transistor is formed in a previous pixel region, and the third drain electrode extends up to the relevant pixel region and is connected to the relevant pixel electrode through the third contact hole.

5. A method of fabricating an LCD device having a touch screen function, comprising the steps of:
   forming gate wiring including a gate line and first to third gate electrodes on an insulating substrate;
   forming a gate insulating film for covering the gate wiring;

forming first to third semiconductor patterns on the gate insulating film;

forming, on the gate insulating film, data wiring including a data line that intersects the gate line, first to third source electrodes and first to third drain electrodes that are electrically connected to the first to third semiconductor patterns, and a signal line that is connected to the second source electrode;

forming a protection film that covers the semiconductor patterns and the data wiring;

forming first to third contact holes, through which the first to third drain electrodes are exposed, in the protection film; and forming a pixel electrode that is connected to the first to third drain electrodes through the first to third contact holes.

6. The method as claimed in claim 5, wherein the third drain electrode extends from a previous pixel region up to a relevant pixel region and is connected to a relevant pixel electrode through the third contact hole.

7. An LCD device having a touch screen function, comprising:

an insulating substrate;

a gate line formed on the insulating substrate;

a gate insulating film covered on the gate line;

a data line that intersects the gate line and defines a pixel region on the gate insulating film;

a signal line formed substantially in parallel with the data line;

a first thin film transistor electrically connected to both the gate line and the data line;

a second thin film transistor electrically connected to both a previous gate line and the signal line;

a protection film that covers the first and second thin film transistors, the data line and the signal line, and includes first and second contact holes through which each of drain electrodes of the first and second thin film transistors is exposed; and a pixel electrode that is connected to the first and second drain electrodes through the first and second contact holes.

8. A method of fabricating an LCD device having a touch screen function, comprising the steps of:

forming gate wiring including a gate line and first and second gate electrodes on an insulating substrate;

forming a gate insulating film for covering the gate wiring;

forming first and second semiconductor patterns on the gate insulating film;

forming, on the gate insulating film, data wiring including a data line that intersects the gate line, first and second source electrodes and first and second drain electrodes that are electrically connected to the first and second semiconductor patterns, and a signal line that is connected to the second source electrode;

forming a protection film that covers the semiconductor patterns and the data wiring;

forming first and second contact holes, through which the first and second drain electrodes are exposed, in the protection film; and forming a pixel electrode that is connected to the first and second drain electrodes through the first and second contact holes.

* * * * *